(12) United States Patent
Takacs et al.

(10) Patent No.: US 11,495,221 B2
(45) Date of Patent: Nov. 8, 2022

(54) VERIFICATION OF WIRELESS COMMUNICATIONS BETWEEN A VEHICLE USER AND A REMOTE ENTITY

(71) Applicant: LOCKHEED MARTIN CORPORATION, Bethesda, MD (US)

(72) Inventors: Robert S. Takacs, Oxford, CT (US); Margaret M. Lampazzi, Oxford, CT (US); Michael A. Connor, New Haven, CT (US); Carl John Pankok, Philadelphia, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 340 days.

(21) Appl. No.: 16/684,995

(22) Filed: Jan. 17, 2020

(65) Prior Publication Data
US 2021/0225371 A1    Jul. 22, 2021

(51) Int. Cl.
*G10L 15/22* (2006.01)
*G08G 5/00* (2006.01)
*B64C 39/02* (2006.01)
*G05D 1/00* (2006.01)
*G10L 15/26* (2006.01)

(52) U.S. Cl.
CPC ............ *G10L 15/22* (2013.01); *B64C 39/024* (2013.01); *G05D 1/0022* (2013.01); *G08G 5/0013* (2013.01); *G08G 5/0021* (2013.01); *G10L 15/26* (2013.01); *G10L 2015/223* (2013.01); *G10L 2015/228* (2013.01)

(58) Field of Classification Search
CPC ... G10L 15/26; G10L 15/22; G10L 2015/223; G10L 2015/228; G10L 2015/221; B64C 39/024; B64C 13/503; B64C 27/04; G05D 1/0022; G08G 5/0013; G08G 5/0021; G08G 5/0052; B64D 43/00; G06F 3/167
See application file for complete search history.

(56) References Cited

U.S. PATENT DOCUMENTS

| 9,443,433 B1 | 9/2016 | Conway et al. |
| 9,666,178 B2 | 5/2017 | Loubiere et al. |
| 9,824,689 B1* | 11/2017 | Shapiro .................. G10L 15/22 |
| 9,922,651 B1 | 3/2018 | Nelson et al. |

(Continued)

*Primary Examiner* — Matthew H Baker
(74) *Attorney, Agent, or Firm* — Foley & Lardner LLP (57) ABSTRACT

A communication system includes a vehicle communication assembly connected to a vehicle, including a transmitter and a receiver, and configured to wirelessly communicate with a remote entity, and a processing device and a memory coupled to the processing device. The memory includes computer-executable instructions that, when executed by the processing device, cause the processing device to receive a wireless signal including a speech communication from the remote entity at the receiver, analyze the wireless signal by a speech recognition module to identify the speech communication, and recognize a known directive within the speech communication based on stored contextual information. The instructions also cause the processing device to, based on recognizing the known directive, present a textual representation of the known directive to a user of the vehicle, and determine that the processing device correctly recognized the known directive based on detecting an input from the user verifying the known directive.

17 Claims, 4 Drawing Sheets

(56) References Cited

U.S. PATENT DOCUMENTS

| | | | |
|---|---|---|---|
| 10,971,155 B2* | 4/2021 | Songa | G08G 5/0013 |
| 2007/0288129 A1* | 12/2007 | Komer | G08G 5/0013 |
| | | | 701/3 |
| 2014/0122070 A1* | 5/2014 | Prus | G08G 5/0021 |
| | | | 704/235 |
| 2015/0081137 A1* | 3/2015 | Gannon | G01C 23/005 |
| | | | 701/3 |
| 2016/0347176 A1* | 12/2016 | Kawalkar | B60K 35/00 |
| 2017/0365177 A1* | 12/2017 | Puentes | B64D 45/00 |
| 2018/0174588 A1* | 6/2018 | Agarwal | G10L 15/01 |
| 2019/0118964 A1* | 4/2019 | Saptharishi | G08G 5/0013 |
| 2020/0302808 A1* | 9/2020 | Chen | G08G 5/045 |
| 2021/0020168 A1* | 1/2021 | Dame | G10L 25/84 |
| 2021/0225371 A1* | 7/2021 | Takacs | G08G 5/0013 |
| 2022/0034682 A1* | 2/2022 | Chandrashekarappa | G08G 5/0091 |

* cited by examiner

VERIFICATION OF WIRELESS COMMUNICATIONS BETWEEN A VEHICLE USER AND A REMOTE ENTITY

BACKGROUND

The present disclosure relates to the art of communications, and more particularly, to monitoring and facilitating audio communications to and/or from a vehicle system.

Aircraft and other vehicles in various applications utilize radio communication with remote users and systems, for example to facilitate landing and takeoff of aircraft. For example, aircraft typically communicate with air traffic controllers using voice communications as the primary means of communication and compliance. The workload of aircraft pilots typically includes continuously monitoring air traffic control (ATC) radio communications, and responding to spoken instructions (e.g., navigational directions) by confirming such instructions audibly and manually adjusting the aircraft accordingly. The high priority of ATC communication requires the pilot to pause his/her ongoing tasks to listen to the communication, then resume the ongoing task upon completion of the communication task. Variability in message delivery times can sometimes prevent the pilot from planning his/her tasks to accommodate the incoming ATC message. These facets of communication result in cognitive workload spikes for the pilot, particularly during high-workload phases of flight such as approach to landing.

BRIEF DESCRIPTION

According to one or more embodiments, a communication system includes a vehicle communication assembly connected to a vehicle and including a transmitter and a receiver, the vehicle communication assembly configured to wirelessly communicate with a remote entity, and a processing device and a memory coupled to the processing device. The memory includes computer-executable instructions that, when executed by the processing device, cause the processing device to receive a wireless signal including a speech communication from the remote entity at the receiver, analyze the wireless signal by a speech recognition module to identify the speech communication, and recognize a known directive within the speech communication based on stored contextual information. The instructions also cause the processing device to, based on recognizing the known directive, present a textual representation of the known directive to a user of the vehicle, and determine that the processing device correctly recognized the known directive based on detecting an input from the user verifying the known directive.

In addition to one or more of the features described above, or as an alternative, the vehicle is an aircraft and the remote entity is an air traffic control system.

In addition to one or more of the features described above, or as an alternative, the vehicle includes an autonomous control system configured to control an operational parameter of the vehicle in response to the user verifying the known directive.

In addition to one or more of the features described above, or as an alternative, the stored contextual information includes a plurality of known directives associated with a selected context.

In addition to one or more of the features described above, or as an alternative, the selected context includes the vehicle being an aircraft and the remote entity being an air traffic control system, and the contextual information includes one or more known air traffic control commands and one or more known aircraft identifiers.

In addition to one or more of the features described above, or as an alternative, the processing device is configured to analyze the known directive to determine whether the known directive is feasible based on the contextual information.

In addition to one or more of the features described above, or as an alternative, the processing device is configured to alert at least one of the user and the remote entity based on the processing device determining that the known directive is not feasible.

In addition to one or more of the features described above, or as an alternative, the processing device is further configured to detect a verbal input by the user, compare the known directive to the verbal input, and present the textual representation based on a determination that the recognized known directive agrees with the verbal input.

In addition to one or more of the features described above, or as an alternative, presenting the textual representation includes pre-populating a display with the known directive and presenting the display to the user.

In addition to one or more of the features described above, or as an alternative, the vehicle communication assembly is configured to communicate with the remote entity using radio signals.

According to one or more embodiments, a method of communication between a vehicle and a remote entity includes receiving a wireless signal from the remote entity at a vehicle communication assembly connected to the vehicle, the wireless signal including a speech communication, the vehicle communication assembly including a transmitter and a receiver. The method also includes analyzing the wireless signal by a processing device including a speech recognition module to identify the speech communication, and recognizing a known directive within the speech communication based on stored contextual information. The method further includes, based on recognizing the known directive, presenting a textual representation of the known directive to a user of the vehicle, and determining that the processing device correctly recognized the known directive based on detecting an input from the user verifying the known directive.

In addition to one or more of the features described above, or as an alternative, the vehicle is an aircraft and the remote entity is an air traffic control system.

In addition to one or more of the features described above, or as an alternative, the method further includes controlling an operational parameter of the vehicle by an autonomous control system in response to the user verifying the known directive.

In addition to one or more of the features described above, or as an alternative, the stored contextual information includes a plurality of known directives associated with a selected context.

In addition to one or more of the features described above, or as an alternative, the selected context includes the vehicle being an aircraft and the remote entity being an air traffic control system, and the contextual information includes one or more known air traffic control commands and one or more known aircraft identifiers.

In addition to one or more of the features described above, or as an alternative, the method further includes analyzing the known directive to determine whether the known directive is feasible based on the contextual information.

In addition to one or more of the features described above, or as an alternative, the method further includes alerting at least one of the user and the remote entity based on the processing device determining that the known directive is not feasible.

In addition to one or more of the features described above, or as an alternative, the method further includes detecting a verbal input by the user, comparing the known directive to the verbal input, and presenting the textual representation based on a determination that the recognized known directive agrees with the verbal input.

In addition to one or more of the features described above, or as an alternative, presenting the textual representation includes pre-populating a display with the known directive and presenting the display to the user.

According to one or more embodiments, a communication system includes a communication assembly connected to an entity and including a transmitter and a receiver, the communication assembly configured to wirelessly communicate with a vehicle remotely located relative to the entity, and a processing device and a memory coupled to the processing device. The memory includes computer-executable instructions that, when executed by the processing device, cause the processing device to receive a wireless signal including a speech communication from the vehicle at the receiver, analyze the wireless signal by a speech recognition module to identify the speech communication, and recognize a known directive within the speech communication based on stored contextual information. The instructions also cause the processing device to, based on recognizing the known directive, present a textual representation of the known directive to a user, and determine that the processing device correctly recognized the known directive based on detecting an input from the user verifying the known directive.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
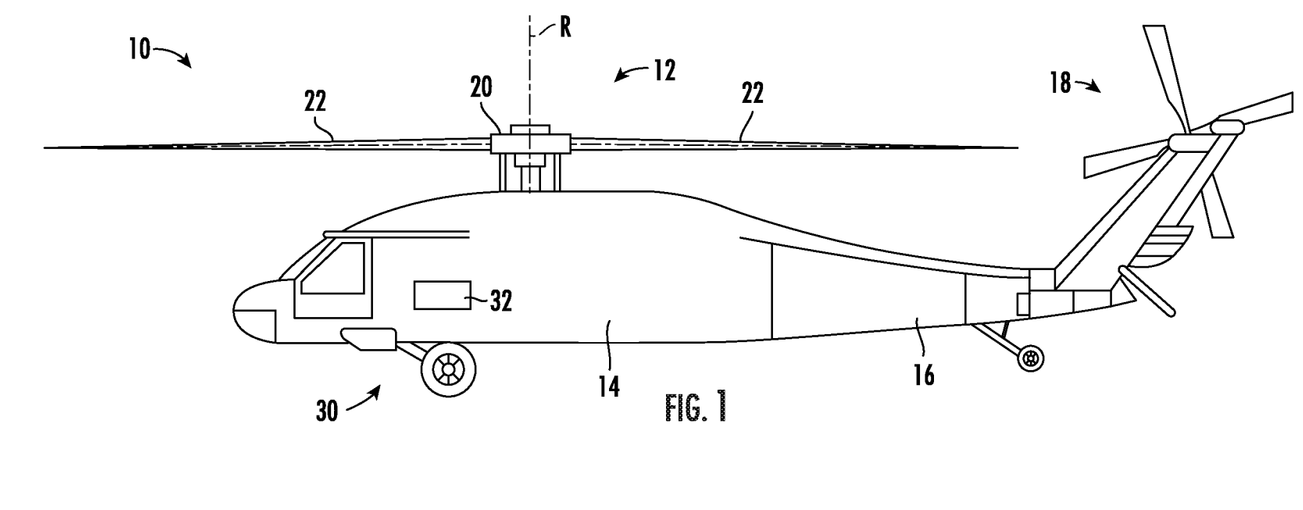
FIG. 1 depicts a rotary wing aircraft including components of a communication system, in accordance with an exemplary embodiment.

FIG. 1 schematically illustrates an example of a rotary wing aircraft 10 having a main rotor assembly 12. The aircraft 10 includes an airframe 14 having an extending tail 16 which mounts a tail rotor system 18. The main rotor assembly 12 includes a plurality of rotor blades 22 mounted to a rotor hub assembly 20. The main rotor assembly 12 is driven about an axis of rotation R through a main gearbox by one or more engines.

Although a particular rotary wing helicopter configuration is illustrated and described in this example, embodiments described herein are not so limited, and can be utilized in conjunction with any aircraft or vehicle. Examples of such aircraft include high speed compound rotary wing aircrafts with supplemental translational thrust systems, dual contra-rotating, coaxial rotor system aircrafts, tilt-rotors and tilt-wing aircrafts, vertical takeoff and lift rotary wing aircrafts, and fixed wing aircraft. In addition, as discussed further below, embodiments described herein are applicable to any vehicle or vehicle system that utilizes radio or other audible communications.

The aircraft 10 includes components of a communication system 30 configured to facilitate communication between the aircraft 10 and a remote entity, such as an air traffic control system. The communication system 30 is configured to detect wireless communications that include speech directives and/or other speech communications, recognize the speech communications, and contextually analyze the speech communication to identify known directives and/or known information.

As described herein, known directives and/or known information refers to commands, informational alerts, identifiers and any other information transmitted according to a pre-selected format based on a given context. For example, if the context is communication between the aircraft 10 and an air traffic control (ATC) system, known directives include commands and information issued according to a pre-selected ATC protocol.

In one embodiment, the communication system 30 is configured to transcribe the speech communication to a textual format. Based on identifying a known directive and/or known information (either by analyzing the textual information or by analyzing speech directly), the communication system 30 automatically presents the known directive and/or known information to a user (e.g., a pilot). The communication system 30 includes features or functionality to allow the user to verify or confirm whether the presented information corresponds to that heard by the user. In one embodiment, the communication system 30 is configured to detect the speech communication and the known directive and/or known information, and automatically present the known directive and/or known information in response to detecting the user's verbal read back and confirming that the speech communication and the verbal read back agree (i.e., are the same or substantially similar).

The communication system 30 reduces user workload by providing an automatic, real time display of speech communications that allows the user to quickly confirm instructions and communications and reduces the workload of the user. For example, during some phases of flight (e.g., landing and taking off), pilots must typically monitor ATC radio communications and respond to random spoken instructions including navigational directions by manually adjusting the aircraft heading, altitude, etc. This activity can result in high-workload task "spikes" encountered during such phases of flight, and presents challenges for workload management. The communication system 30 reduces the workload by allowing the pilot to quickly and easily visually confirm ATC communications versus the higher workload task of listening and deciphering ATC controller communication and comprehending the instructions. Similarly, the communication system eliminates the need for the pilot to perform certain actions that are typically required, such as having to manually (e.g., key in, or rotate a knob) enter data from ATC communications.

Figure 2:
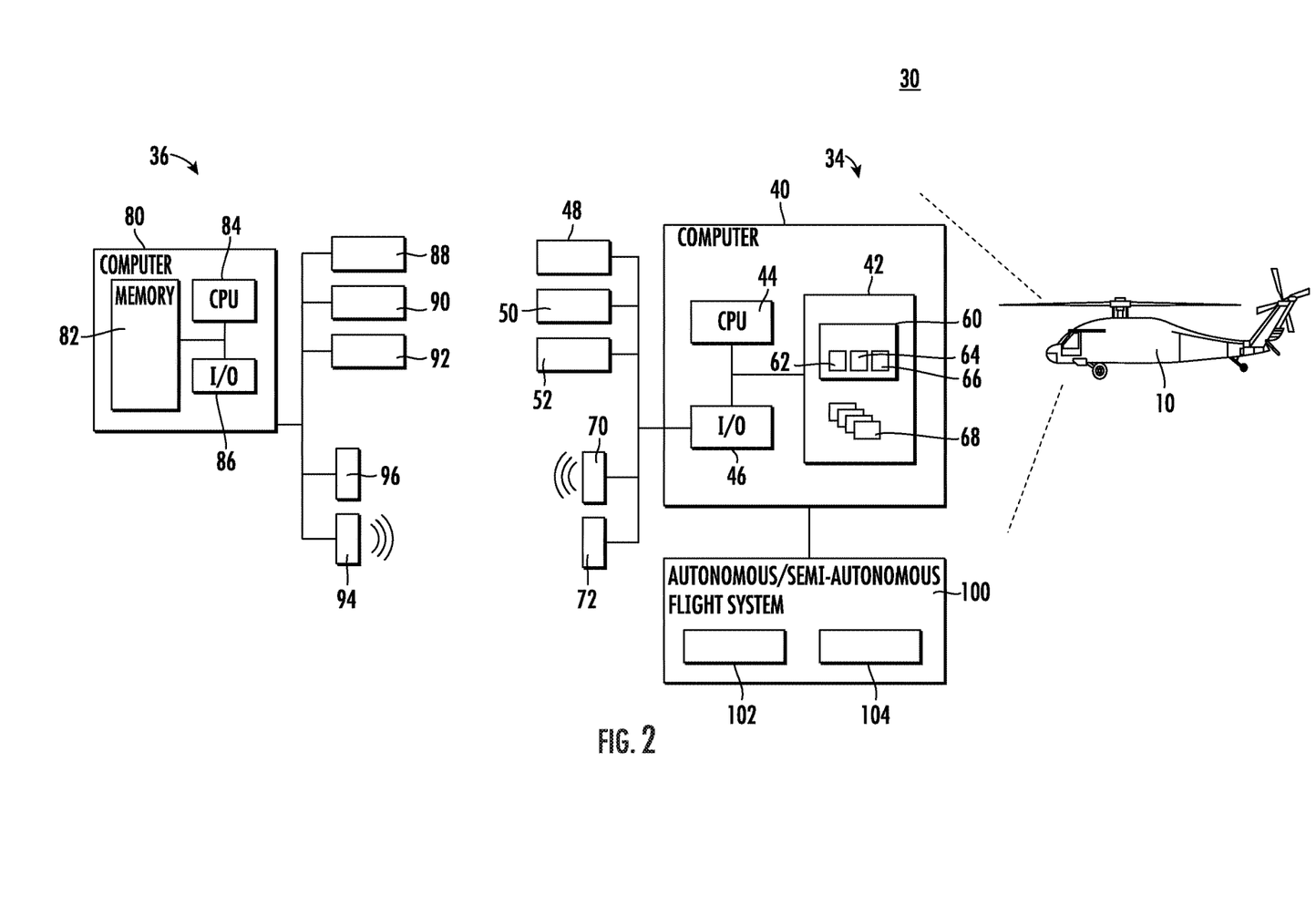
FIG. 2 depicts a schematic diagram of a communication system for communication between a vehicle and a remote location, in accordance with an embodiment.

Referring to FIG. 2, the communication system 30 includes a first communication assembly 34, which in one embodiment is connected to a vehicle such as the aircraft 10 and can be referred to as an aircraft communication assembly or vehicle communication assembly 32. The communication system 30 also includes a second communication assembly 36, which in one embodiment is connected to a remote entity and can be referred to as a remote communication assembly 36. The communication system 30 is not so limited. For example, the first communication assembly 34 can be a remote communication assembly and the second communication assembly can be a vehicle communication assembly.

The vehicle communication assembly 34 includes a computer 40 having a memory 42 and a processor 44. The computer 40 also includes an input/output (I/O) device 46 coupled to various external devices, such as a microphone, headset, keyboard, pilot controls and others. For example, the I/O device 44 is connected to a display 48, a speaker 50 and a microphone 52.

The processor 44 can be any type or combination of computer processors, such as a microprocessor, microcontroller, digital signal processor, application specific integrated circuit, programmable logic device, and/or field programmable gate array, and may be configured as a central processing unit (CPU). The memory 42 can include volatile and non-volatile memory, such as random access memory (RAM), read only memory (ROM), or other electronic, optical, magnetic, or any other computer readable storage medium onto which data and control logic as described herein are stored. Therefore, the memory 42 is a tangible storage medium where instructions executable by the processor 44 are embodied in a non-transitory form.

The memory 42 may include at least one program product having a set (e.g., at least one) of program modules that are configured to carry out functions described herein. For example, a program/utility 60, having a set (at least one) of program modules may be stored in the memory 42. The program modules may generally carry out the functions and/or methodologies of embodiments as described herein.

For example, the program/utility 60 includes a speech recognition module 62 configured to recognize or identify directives and/or other information in a transmission signal carrying speech (audio) communications. The speech recognition module 62 may also transcribe at least part of the audio communication into a textual format. The program/utility 60 may also include an analysis module 64 configured to contextually recognize known directives and/or information, and a display module 66 configured to automatically present recognized known directives and/or information to a user (e.g., a pilot or co-pilot).

The memory 42 may also store data in various data structures. For example, the memory 42 stores data files 68 or other structures to store data such as contextual information. The contextual information includes, for example, a plurality of known directives related to a given context. A "context" refers to a specific type of system or method that utilizes known or pre-selected communications or communication protocols. Examples of contexts include air traffic control, shipping (e.g., communications between a ship and an entity or system of a port), cargo transport using a ship and/or an aircraft, and command and control operations.

The vehicle communication assembly 36 also includes a transmitter 70 configured to transmit wireless communications and a receiver 72 configured to receive wireless communications. In one embodiment, the transmitter 70 and the receiver 72 include antennas for transmitting and receiving radio signals. The transmitter 70 and the receiver 72 may be separate components or configured as a single transceiver.

The remote communication assembly 36 includes a computer 80 having a memory 82, a processor 84 and an input/output (I/O) device 86 coupled to various external devices, such as a microphone, headset, keyboard and others. For example, the I/O device 86 is connected to a display 88, a speaker 90 and a microphone 92. The remote communication assembly 36 may also store data such as contextual information and include suitable processing modules to perform various aspects of the methods described herein.

The remote communication assembly 36 also includes a transmitter 94 configured to transmit wireless communications and a receiver 96 configured to receive wireless communications. In one embodiment, the transmitter 94 and the receiver 96 include antennas for transmitting and receiving radio signals. The transmitter 94 and the receiver 96 may be separate components or configured as a single transceiver.

Various functions of the communication assembly 30 are described as being performed by a vehicle communication assembly. It is noted that the same or similar functions can be carried out by a remote communication assembly. For example, in the context of ATC communications, the remote communication assembly 36 can be configured to monitor communications from the vehicle communication assembly, analyze the communications via a speech recognition module, contextually recognize known information and display recognized known information to an air traffic controller or other user for verification to, e.g., reduce the workload on an air traffic controller. In this example, a directive can be any form or type of communication or information, such as an identifier transmitted to the ATC, acknowledgement of directives sent by the ATC, and information regarding the position and heading of an aircraft or other vehicle. In one embodiment, the aircraft 10 and/or the communication system 30 is connected to an autonomous or semi-autonomous flight system 100 configured to autonomously control the aircraft 10 (e.g., speed, heading, bank angle, altitude, etc.). The flight system 100 can include autopilot software 102 executed by one or more processors 104 in communication with the communication system 30. The autopilot software may generate commands or input for flying the aircraft 10 based on directives recognized by the communication system 30.

Although the embodiments are described in conjunction with a helicopter, the embodiments are not so limited and can be applied to any vehicle. A "vehicle" as used herein refers to anything that transports persons or things. Examples of vehicles include wheeled vehicles such as cars and truck, aircraft such as a helicopter or fixed wing aircraft, marine vehicles such as recreational boats, commercial boats, patrol boats and ships (e.g., cargo ships, tankers etc.).

Figure 3:
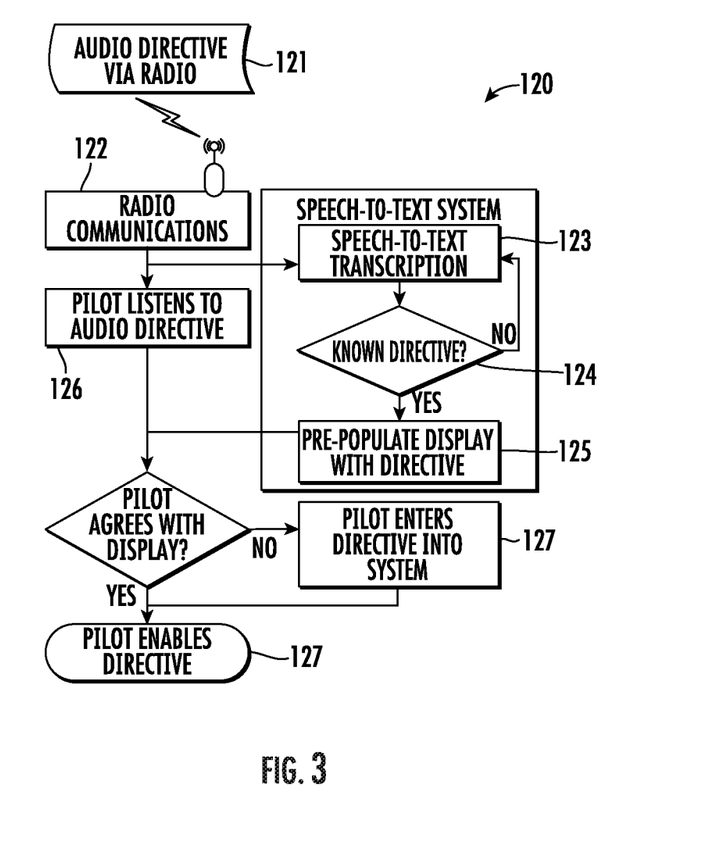
FIG. 3 is a flowchart that depicts an embodiment of a method of communication between a vehicle user and a remote location.

FIG. 3 illustrates an embodiment of a method 120 of communication between a vehicle user and a remote entity. The remote entity may be a human operator and/or processing device in communication with the vehicle. The method 120 includes a number of method steps or stages 121-127. The method 120 may be performed as described below and include all of the steps or stages in the order described. The method is not so limited, as the method may include fewer than all of the steps or stages, or may include performing one or more of the steps or stages in a different order than that described below.

In the following description, the vehicle is an aircraft such as the aircraft 10 of FIGS. 1 and 2, and the remote entity is an air traffic control (ATC) system such as one located at an observation tower or other location in an airport. It is noted that the method 120 is not so limited and can be applied to various contexts.

In the first stage 121, an audio directive is transmitted from a transmitter in the ATC system, such as the transmitter 94. For example, an air traffic controller issues a directive to the aircraft 10 that includes an aircraft identifier such as a call sign or tail numbers/letters, and a command (e.g., turn to a given heading). Typically, in conventional systems, the aircraft pilot or other crew member (e.g., co-pilot) manually enters data relating the directive, which as discussed above, can be difficult in high-workload phases (e.g., landing) or infeasible if the pilot is incapacitated in some way.

In the second stage 122, aspects of a communication system (e.g., the aircraft communication assembly 34) continuously or periodically monitors radio communications, and the audio directive is detected by a receiver in the aircraft 10, such as the receiver 72.

In the third stage 123, the audio directive is input to a processing device or unit that includes a speech to text system (e.g., the speech recognition module 62) and the audio directive is transcribed to text.

In the fourth stage 124, the processing device in the aircraft 10 analyzes the text to determine whether there are any contextually recognizable communications and/or directives. The processing device analyzes the text to find and recognize one or more known or common communications and directives in the context of ATC communications, or in another context if applicable.

In one embodiment, the processing device accesses stored contextual information and determines whether any of the text is the same as, or is in the same format as, stored known directives and/or information associated with the context of ATC communications. Multiple sets of contextual information can be stored and made available so that different users and systems in different contexts can perform the methods described herein.

For example, the processing device analyzes the speech and recognizes a directive of "turn right 230" which is an abbreviated directive for the aircraft 10 to turn right to a heading of 230 degrees. The processing device accesses the contextual information and notes that "turn right" with a number is a known directive format.

The contextual information may be pre-existing and/or input by a user prior to or during vehicle operation. For example, a pilot may pre-enter information such as flight ID, call sign and/or registration, so that the processing device knows all the potential names for the particular aircraft. The pilot may then be responsible for validating the pre-entered data by accepting (or overwriting) each data field in a display.

In the fifth stage 125, if a known communication or directive within the given context is recognized, the known communication or directive is automatically displayed. In the above example, the directive "turn right 230" is prepopulated in the display so that the directive is visible to the pilot.

In one embodiment, the processing device detects verbal inputs by the pilot in response to the audio directive. The verbal inputs are compared to the recognized directive to determine whether they match. If the recognized directive and the pilot's read back are in agreement, the directive is then displayed to the pilot.

In the sixth stage 126, the pilot listens to the audio directive and reads the text displayed by the processor.

In the seventh stage 127, if the pilot confirms that the audio directive and the text display are the same or substantially the same, the pilot enables the directive. Alternatively, if the display does not agree with the audio directive, and the pilot recognizes the directive from the audio, the pilot may execute the directive manually by controlling the aircraft 10 or entering the directive into a control system (e.g., an autonomous control system).

In addition to the above stages, the method 120 can include additional verification functions. For example, the communication system 30, after displaying the recognized directive as text, determines whether executing the directive is feasible. For example, the system 30 can determine whether executing the directive would be safe, for example, by performing a range check (does the aircraft have the range to execute the directive?) and identifying potential obstacles. In another example, the system can determine contextually whether a command would make sense in relation to mission parameters.

The communication system 30 is not limited to displaying recognized directives and/or other recognized communications as text. For example, the communication system can display recognized communications and any other relevant information in graphical form, such as a three-dimensional representation of a flight plan, maps, arrows, numbers, track lines and others.

Figure 4A:
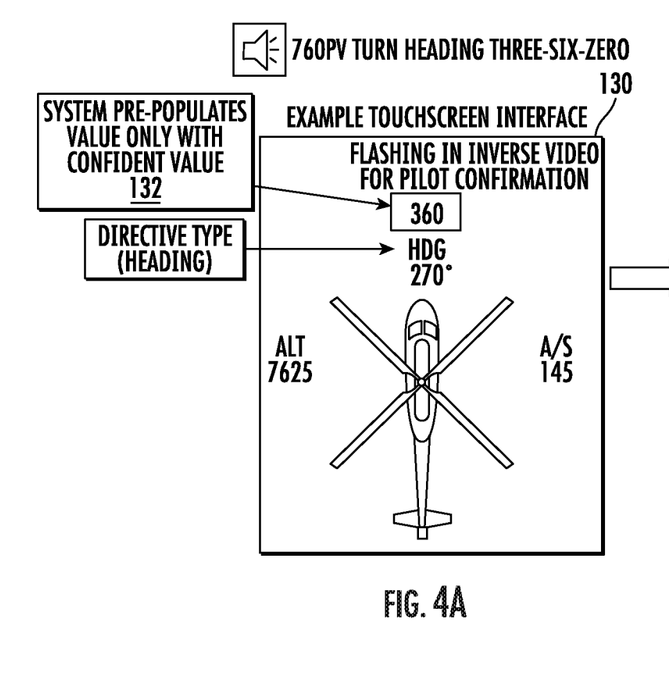
FIGS. 4A and 4B depict an example of a display useable by a pilot or other user in conjunction with the method of FIG. 3.
Figure 4B:
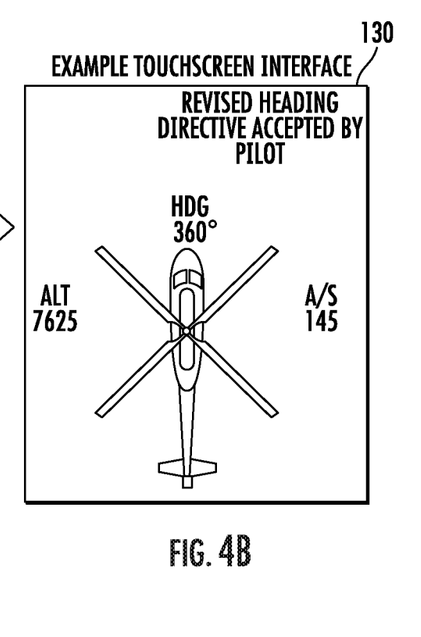

FIGS. 4A and 4B depict an example of a display 130 utilized by the method 120. The display 130 is part of a touchscreen interface but is not so limited. As shown, the display 130 provides flight information to the pilot. In FIG. 4A, the display 130 shows the current heading (HDG), the altitude (ALT) and the airspeed (A/S) of the aircraft 10 during an operation. The display 130 also includes a text box 132 or other suitable display feature into which a recognized directive is populated.

In this example, the communication system 30 receives an audio communication that includes a speech directive to a pilot to turn the aircraft 10 to a heading of 360 degrees. The communication system 30 detects and interprets the audio communication to identify the directive, and then listens for the pilot to read back the directive by detecting and interpreting verbal inputs by the pilot. The communication system 30, after transcribing the audio communication and recognizing the directive, compares the directive to the pilot's verbal input. If they agree, the communication system 30 populates the text box 132 with a heading value of 360 degrees.

If the pilot agrees with the value in the text box 132, the pilot can accept the heading value (e.g., by touching or selecting the text box 132 or by any other suitable mechanism, such as pushing a button or providing an audible confirmation recognizable by the system). As shown in FIG. 4B, once accepted, the pilot or a control system turns the aircraft 10 to the accepted heading and the accepted heading is displayed as the current heading.

Embodiments described herein present a number of advantages and technical effects. For example, the communication systems and methods reduce pilot workload and improve safety for existing aircraft. In addition, the reduced workload requirements are useful in improving the design of single pilot cockpits.

Typically, aircraft pilots continuously monitor ATC radio communications, and respond to spoken instructions including navigational directives by manually adjusting the aircraft heading, altitude, etc. This activity results in high-workload task spikes due to the nature of this comprehension task and somewhat random ATC communication calls. Additionally, when encountered in critical (busy) phases of flight, it presents challenges for workload management in the design of single pilot cockpit operations afforded by autonomous technology. The embodiments described herein reduces the workload on the pilot.

In addition, particularly in single pilot instances, the embodiments allow for effective communication and autonomous control in the event of an incapacitated pilot. An autonomous system cannot act on ATC instruction if it is not aware of the instruction. Embodiments described herein can listen for an identifier (e.g., the aircraft tail number or call sign), record the ATC instruction and present the instruction to an autonomous system to control the aircraft accordingly. For example, an autonomous control system can be configured to, in the event of detection of pilot incapacitation, enter an operating mode in which pilot verification (i.e., a requirement that the pilot read back a directive) is skipped.

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A communication system, comprising:
   a vehicle communication assembly connected to a vehicle and including a transmitter and a receiver, the vehicle communication assembly configured to wirelessly communicate with a remote entity; and
   a processing device, connected to the vehicle, and a memory coupled to the processing device and comprising computer-executable instructions that, when executed by the processing device, cause the processing device to:
   receive a wireless signal including a speech communication from the remote entity at the receiver;
   analyze the wireless signal by a speech recognition module to identify the speech communication;
   recognize a known directive within the speech communication based on contextual information stored in the memory;
   present, responsive to recognition of the known directive and via a display device of the vehicle, a textual representation of the known directive to a user of the vehicle, the user of the vehicle being different from the remote entity;
   receive, subsequent to the presentation of the textual representation via the display device, a verbal input from the user of the vehicle;
   compare the verbal input received from the user of the vehicle subsequent to the presentation, via the display device, of the textual representation with the known directive identified within the speech communication from the remote entity different from the user to determine that the verbal input is the same as the known directive; and determine, based on the verbal input being the same as the known directive, that the processing device correctly recognized the known directive.

2. The communication system of claim 1, wherein the vehicle is an aircraft and the remote entity is an air traffic control system.

3. The communication system of claim 1, wherein the vehicle includes an autonomous control system configured to control an operational parameter of the vehicle in response to the user verifying the known directive.

4. The communication system of claim 1, wherein the contextual information includes a plurality of known directives associated with a selected context.

5. The communication system of claim 4, wherein the selected context includes the vehicle being an aircraft and the remote entity being an air traffic control system, and the contextual information includes one or more known air traffic control commands and one or more known aircraft identifiers.

6. The communication system of claim 1, wherein the processing device is configured to analyze the known directive to determine whether the known directive is feasible based on the contextual information.

7. The communication system of claim 6, wherein the processing device is configured to alert at least one of the user and the remote entity based on the processing device determining that the known directive is not feasible.

8. The communication system of claim 1, wherein presenting the textual representation includes pre-populating a display with the known directive and presenting the display to the user.

9. The communication system of claim 1, wherein the vehicle communication assembly is configured to communicate with the remote entity using radio signals.

10. A method of communication between a vehicle and a remote entity, comprising:

receiving, by a processing device of the vehicle, a wireless signal from the remote entity at a vehicle communication assembly connected to the vehicle, the wireless signal including a speech communication, the vehicle communication assembly including a transmitter and a receiver;

analyzing, by the processing device, the wireless signal via a speech recognition module to identify the speech communication;

recognizing, by the processing device, a known directive within the speech communication based on contextual information stored in memory coupled to the processing device;

presenting, by the processing device responsive to recognizing the known directive and via a display device of the vehicle, a textual representation of the known directive to a user of the vehicle, the user of the vehicle being different from the remote entity;

receiving, by the processing device subsequent to presentation of the textual representation via the display device, a verbal input from the user of the vehicle;

comparing, by the processing device, the verbal input received from the user of the vehicle subsequent to the presentation, via the display device, of the textual representation with the known directive identified within the speech communication from the remote entity different from the user to determine that the verbal input is the same as the known directive; and determining, by the processing device, that the processing device correctly recognized the known directive based on the verbal input being the same as the known directive.

11. The method of claim 10, wherein the vehicle is an aircraft and the remote entity is an air traffic control system.

12. The method of claim 10, further comprising controlling, by the processing device, an operational parameter of the vehicle by an autonomous control system in response to the user verifying the known directive.

13. The method of claim 10, wherein the contextual information includes a plurality of known directives associated with a selected context.

14. The method of claim 13, wherein the selected context includes the vehicle being an aircraft and the remote entity being an air traffic control system, and the contextual information includes one or more known air traffic control commands and one or more known aircraft identifiers.

15. The method of claim 10, further comprising analyzing, by the processing device, the known directive to determine whether the known directive is feasible based on the contextual information.

16. The method of claim 15, further comprising alerting, by the processing device, at least one of the user and the remote entity based on the processing device determining that the known directive is not feasible.

17. The method of claim 10, wherein presenting the textual representation includes pre-populating a display with the known directive and presenting the display to the user.

* * * * *